2,744,885

AMINOALKYL ESTERS

Peter L. de Benneville and Homer J. Sims, Philadelphia, Pa., assignors to Rohm & Haas Company, Philadelphia, Pa., a corporation of Delaware No Drawing. Application July 20, 1954,
Serial No. 444,646

6 Claims. (Cl. 260—78.5)

This invention deals with esters of acrylic or methacrylic acid and 7-amino-3,7-dimethyloctanol and also concerns polymers thereof.

These esters are prepared by reacting together in the presence of a transesterification catalyst (1) a lower alkyl acrylate of methacrylate, $R^0OOCC(R^x)=CH_2$ where $R^0$ is an alkyl group preferably of not over four carbon atoms and $R^x$ is hydrogen or the methyl group, and (2) 7-amino-3,7-dimethyloctanol. Under the influence of heat and transesterification catalyst a lower alkanol is split out and an aminoalkyl ester is formed.

When the usual primary amine is heated with an ester, an amide is formed. For example, if ethanolamine is heated with methyl acrylate, without or with an alkali metal alcoholate, considerable N-hydroxyethylacrylamide is formed. At the same time complex products result which lead to insoluble polymeric products.

It was, therefore, unexpected to discover that when the primary amine,

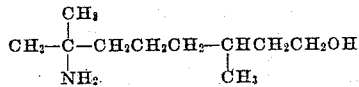

is reacted with methyl acrylate, ethyl acrylate, butyl acrylate, methyl methacrylate, ethyl methacrylate, butyl methacrylate, or the like, aminoalkyl acrylates and methacrylates result which contain a primary amino group having reactive hydrogen on the nitrogen thereof. This amino group may be utilized in chemical reactions in which these new aminoalkyl esters serve as intermediates. These aminoalkyl esters may be used to form polymers and copolymers in which the amino group plays a determining role.

The reaction of 7-amino-3,7-dimethyloctanol and a lower alkyl acrylate or methacrylate is effected at temperatures between 60° and 160° C., usually 65° to 125° C., in the presence of an aluminum alkoxide, or a tetraalkyl titanate as catalyst. The reaction is carried out by mixing 7-amino-3,7-dimethyloctanol and lower alkyl ester of acrylic or methacrylic acid together with a transesterification catalyst and heating the mixture with removal of lower alkanol. The reaction may be accomplished under normal, increased, or reduced pressures. Usually the reaction is run at the temperatures at which alcohol or a mixture of alcohol and lower alkyl acrylate is distilled from the reaction mixture. The excess or free alkyl acrylate or methacrylate is distilled off to leave the desired product as a residue, which can be purified by charcoaling, extracting, and/or distilling.

Typical catalysts are aluminum ethoxide, aluminum isopropoxide, and tetraisopropyl titanate, or tetrabutyl titanate. The amount of catalyst used is generally between 0.1% and 3% of the weight of the reactants. It should be noted that the alkoxide groups and the alkyl groups contain not over four carbon atoms in the case of preferred catalysts.

It is advisable to have present in the reaction mixture a polymerization inhibitor. Many such inhibitors are known and are available. Typical inhibitors which may be mentioned by way of example are di-β-naphthol, p-hydroxydiphenylamine, and hydroquinone.

Typical of the starting acrylates and methacrylates which may be used are the methyl, ethyl, propyl, and butyl esters. One or more of these is desirably used in excess of the aminodimethyloctanol.

The following examples present typical procedures for performing the process of this invention. Parts are by weight.

Example 1

There are mixed 57.6 parts of 7-amino-3,7-dimethyloctanol, 66.6 parts of methyl methacrylate, 2 parts of aluminum isopropoxide, and 7.2 parts of di-β-naphthol. The mixture is heated under reflux with partial take-off of methanol. After eight hours about the theoretical quantity of methanol is collected. The reaction mixture is then subjected to fractional distillation. After a forerun there is taken a fraction of 74 parts, coming over at 120–146° C./0.9 mm. and corresponding in composition to 3,7-dimethyl-7-aminooctyl methacrylate. The analytical data for the distillate give 5.6% of nitrogen (theory 5.8%) and neutral equivalent 250 (theory 241).

This compound has the structure

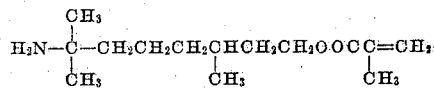

Example 2

There are mixed 57.6 parts of 7-amino-3,7-dimethyloctanol, 100 parts of methyl acrylate, five parts of hydroquinone, and two parts of tetrabutyl titanate. The mixture is heated at first under reflux and then distillate is passed through a short column with an adjustable take-off. The azeotrope of methanol and methyl acrylate is slowly taken off. Methyl acrylate is then distilled, followed by distillation of product under reduced pressure. At about 115°–135° C./1 mm. a fraction of 75 parts of 7-amino-3,7-dimethyloctyl acrylate is obtained. It contains by analysis 5.7% of nitrogen (theory 5.76%).

In the same way other methacrylic or acrylic esters can be used as starting materials. The products obtained are the same as those described above.

The monomeric acrylate and methacrylate of this invention are useful for forming polymers and copolymers in which the primary amino group becomes a distinguishing feature. They are also useful as chemical intermediates, reacting at the amino group or at the vinylidene group in reactions which are typical, including replacement of one or both amino hydrogens and addition at the double bond of substances having a reactive hydrogen.

Polymerization of 3,7-dimethyl-7-aminooctyl acrylate or methacrylate is best effected with the aid of an azo free radical catalyst or initiator. There may be used 0.1% to 2% based on the weight of monomer or monomers of one or more of such compounds as azodiisobutyronitrile, azobis (α-methylbutyronitrile), azobis (α,γ-dimethylvaleronitrile), azodiisobutyramide, dimethyl, diethyl, or dibutyl azodiisobutyrate or azobis (methylvalerate). These and other similar azo compounds can serve as free radical polymerization initiators. They contain an —N=N— group attached to aliphatic carbon atoms, at least one of which is tertiary. These catalysts may be used for preparing both homopolymers and copolymers.

For preparing many copolymers there may be used peroxidic initiators. Typical organic peroxides useful as polymerization catalyst include benzoyl peroxide, caproyl peroxide, acetyl peroxide, cumene hydroperoxide, methyl ethyl ketone peroxide, tert-butyl hydroperoxide, butyl perbenzoate, etc. An amount of 0.1 to 5% of such peroxide based on the weight of monomeric starting materials may be used.

Bulk polymerizations were studied by mixing 1% of dimethyl azodiisobutyrate with the 7-amino-3,7-dimethyloctyl acrylate and the methacrylate. The mixtures were heated at 70° C. for 16 hours. At the end of this time clear gums had formed. These were soluble in organic solvent and could be taken up in lubricating oils to supply viscosity-index improvement, inhibition against corrosion, and dispersing action.

Polymerization may also be accomplished in solution. Thus, a mixture of 40 parts of 3,7-dimethyl-7-aminooctyl methacrylate, 0.3 part of azodiisobutyronitrile, and 10 parts of toluene is slowly added to a reaction vessel in an oil bath at 110° C. The charge is kept under a blanket of nitrogen and stirred. Small additions of catalyst in toluene are made from time to time. Heating is continued for about 20 hours. Toluene is then added to give a solution with a solids (non-volatile) content of 40%. The polymer can be readily transferred to petroleum oils for use as an oil additive.

The above procedure is repeated with 3,7-dimethyl-7-aminooctyl acrylate and with the substitution of dioxane in an amount of 20 parts for the previously used toluene. At the end of 20 hours a small amount of dioxane is added to adjust the solids (i. e. non-volatile) content to 30%. This solution has a viscosity at 100° F. of 6 cs.

Copolymers may also be prepared by bringing together a 7-amino-3,7-dimethyloctyl acrylate or methacrylate with another polymerizable ethylenic compound, preferably a vinylidene compound, such as an alkyl acrylate, alkyl methacrylate, dialkyl itaconate, dialkyl fumarate, styrene, p-methylstyrene, vinyl ether, vinyl ester, allyl ester, vinyl pyridine, vinyl pyrrolidone, acrylonitrile, methacrylonitrile, acrylamides including N-substituted amides, etc. Typical comonomers include methyl acrylate, butyl acrylate, octyl acrylate, dodecyl acrylate, octadecyl acrylate, methyl methacrylate, butyl methacrylate, octyl methacrylate, hexadecyl methacrylate, dimethyl itaconate, diethyl itaconate, dimethyl maleate, diethyl fumarate, vinyl acetate, vinyl propionate, allyl acetate, vinyl isobutyl ether, N-methylmethacrylamide, N-phenylacrylamide, N-benzylmethacrylamide, etc., or with divinylbenzene, diallyl phthalate, ethylene diacrylate, ethylene dimethacrylate, the divinyl ether of ethylene glycol, vinyloxyethyl methacrylate, etc., the latter class giving cross-linked copolymers. These have capacity for taking up acidic constituents from fluids.

There are mixed 30 parts of 3,7-dimethyl-7-aminooctyl methacrylate, 70 parts of lauryl-myristyl methacrylate (the lauryl and myristyl groups being obtained from a fractionated commercial lauryl alcohol), 0.125 part of azodiisobutyronitrile, and 5 parts of toluene. This mixture is slowly charged to a polymerization vessel equipped with stirrer and heated with an oil bath at 110° C. The vessel is flushed continuously with nitrogen. During the course of polymerization addition is made of the azo catalyst as follows: at 3 hours, 0.05 part in 5 parts of toluene; at 4 hours, 0.02 part in one part of toluene; at 5 hours, 0.01 part in toluene; and at 6.8 hours, sufficient toluene to bring the weight of the charge to 200 parts. Heating is thereupon discontinued. The product obtained contains by analysis 41.3% non-volatile, corresponding to a yield of copolymer of 82.7%, and having a viscosity at 100° F. of 161 cs. This is an effective viscosity index improver in lubricating oils.

In a similar fashion there are mixed 7.5 parts of 3,7-dimethyl-7-aminooctyl methacrylate, 292.5 parts of vinyl caprylate, 7.5 parts of azodiisobutyronitrile, and 150 parts of toluene. This mixture is slowly charged to the polymerization vessel maintained at 114°–117° C. with an oil bath. A blanket of nitrogen is used. Azo catalyst is added from hour to hour until an additional amount of 4.9 parts has been used. Copolymerization is continued at about 100° C. after the third hour. Total time of polymerization is 24 hours. At that time toluene is added to bring the total weight to 600 parts. The product is a solution of copolymer in a yield of 91%, the solution containing 45.5% of copolymer. The toluene solution having 30% copolymer has a viscosity of 5.5 cs. at 100° F. The copolymer is useful as an oil additive to improve viscosity-temperature relations.

In the same way other polymerizable monovinylidene or unsaturated ethylenic compounds can be copolymerized with 3,7-dimethyl-7-aminooctyl methacrylate or acrylate.

We claim:

1. As new chemical substances, compounds of the formula

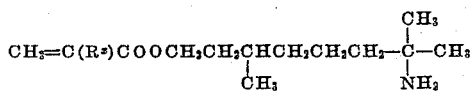

where $R^x$ is a member of the class consisting of hydrogen and the methyl group.

2. The compound of the formula

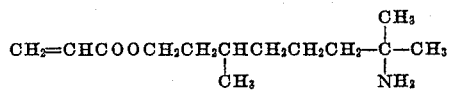

3. The compound of the formula

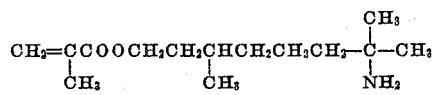

4. Polymers of the compounds

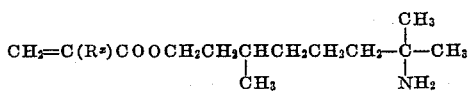

where $R^x$ is a member of the class consisting of hydrogen and the methyl group.

5. Copolymers of the compounds

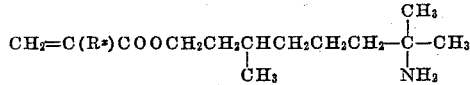

and another polymerizable vinylidene compound where $R^x$ is a member of the class consisting of hydrogen and the methyl group.

6. A process of preparing 7-amino-3,7-dimethyloctyl acrylate and methacrylate which comprises mixing 7-amino-3,7-dimethyloctanol, an ester of the formula $R^oOOCC(R^x)=CH_2$, where $R^x$ is selected from the class consisting of hydrogen and the methyl group and $R^o$ is a lower alkyl group, and a transesterification catalyst from the class consisting of aluminum alkoxides and tetraalkyl titanates, heating the resulting mixture with removal of a lower alkanol, and separating an ester of the formula

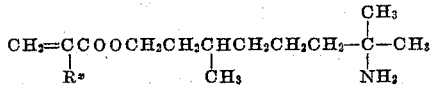

where $R^x$ has the above stated significance.

References Cited in the file of this patent

UNITED STATES PATENTS

| 2,104,796 | Dietrich | Jan. 11, 1938 |
| 2,138,031 | Graves | Nov. 29, 1938 |
| 2,138,763 | Graves | Nov. 29, 1938 |